United States Patent
Morand

(10) Patent No.: US 8,744,667 B2
(45) Date of Patent: Jun. 3, 2014

(54) NON-INTRUSIVE DEVICE FOR DIAGNOSIS, BY VECTORIAL COMPARISON, OF OPERATING SITUATION(S) IN AT LEAST ONE COMMUNICATION NETWORK

(75) Inventor: Nicolas Morand, Antony (FR)

(73) Assignee: Peugeot Citroën Automobiles SA, Velizy Villacoublay (FR)

( * ) Notice: Subject to any disclaimer, the term of this patent is extended or adjusted under 35 U.S.C. 154(b) by 59 days.

(21) Appl. No.: 13/579,277

(22) PCT Filed: Feb. 22, 2011

(86) PCT No.: PCT/FR2011/050369
§ 371 (c)(1),
(2), (4) Date: Aug. 15, 2012

(87) PCT Pub. No.: WO2011/117495
PCT Pub. Date: Sep. 29, 2011

(65) Prior Publication Data
US 2012/0314749 A1    Dec. 13, 2012

(30) Foreign Application Priority Data
Mar. 22, 2010  (FR) ...................................... 10 52054

(51) Int. Cl.
G01M 17/00    (2006.01)
G06F 7/00     (2006.01)

(52) U.S. Cl.
USPC ........ 701/29.1; 701/29.2; 701/29.3; 701/29.4

(58) Field of Classification Search
USPC .............................. 701/29.1, 29.2, 29.3, 29.4
See application file for complete search history.

(56) References Cited

U.S. PATENT DOCUMENTS 5,491,418 A    2/1996  Alfaro et al.
7,134,423 B2 *  11/2006  Zhu et al. ................. 123/406.14
(Continued)

FOREIGN PATENT DOCUMENTS

DE    10313467 A1    10/2004
FR    2666418 A1     3/1992
(Continued)

OTHER PUBLICATIONS

International Search Report from corresponding International Application No. PCT/FR2011/050369 mailed Jan. 6, 2011.

Primary Examiner — Ian Jen
(74) Attorney, Agent, or Firm — Polster Lieder

(57) ABSTRACT

A device (D) is dedicated to the diagnosis of operating situations) in at least one communication network (RC) having a bus (BU) with N wire(s). This device (D) comprises i) P connection means (MCI-MC3), with P≥N, bypass-connected at least to the N wires of the bus (BU) so as to access the P voltages présent, ii) conversion means (MV1-MV3) devised so as to convert the P voltages into P first digital signais (SI (p,t)), iii) processing means (MT) devised so as to construct a measurement vector (V(t)) associated with a voltages measurement instant (t) and comprising K éléments chosen from among at least the P first digital signais (SI (p, t)), then to compare at least this measurement vector (V(t)) with at least I pairs, with I≥1, of first ($V_{r_1}(i,t)$) and second ($V_{r_2}(i,t)$) référence vectors comprising K éléments representative of K minimum and maximum values that can be taken by the K éléments of the measurement vector (V(t)), so as to deliver I second signais (S2($i$)) each représentative of the result of a comparison, each result being représentative of an operating situation on the bus (BU), and iv) I display means (MAI-MAI) each devised so as to signal an operating situation represented by a second signal (S2($i$)) delivered.

18 Claims, 1 Drawing Sheet

(56) References Cited

U.S. PATENT DOCUMENTS

| | | |
|---|---|---|
| 2002/0039030 A1* | 4/2002 | Khazei .......................... 324/750 |
| 2004/0084018 A1* | 5/2004 | Zhu et al. ................. 123/406.14 |
| 2004/0249526 A1 | 12/2004 | Hauer et al. |
| 2007/0067078 A1 | 3/2007 | Salman et al. |
| 2007/0186903 A1* | 8/2007 | Zhu et al. ................. 123/406.37 |

FOREIGN PATENT DOCUMENTS

| | | |
|---|---|---|
| GB | 2248942 A | 4/1992 |
| WO | 97/06514 A1 | 2/1997 |

* cited by examiner

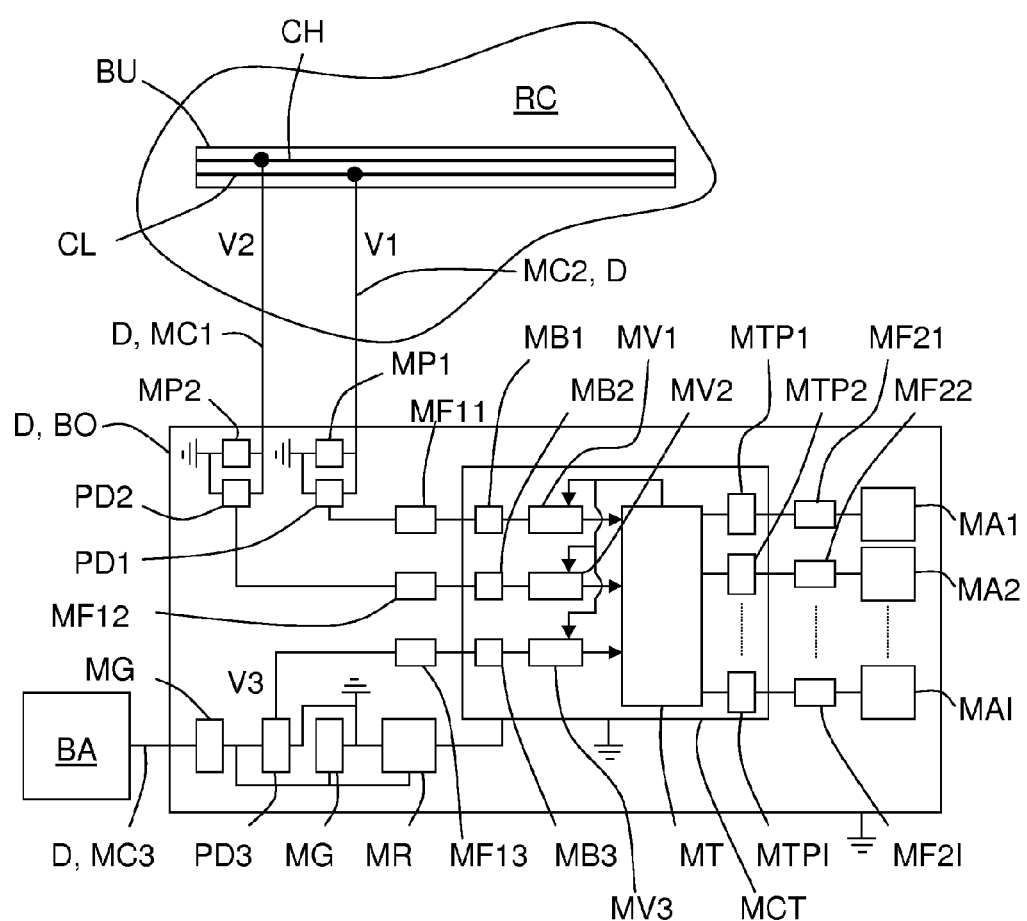

NON-INTRUSIVE DEVICE FOR DIAGNOSIS, BY VECTORIAL COMPARISON, OF OPERATING SITUATION(S) IN AT LEAST ONE COMMUNICATION NETWORK

This application is the U.S. National stage, under 35 U.S.C. §371, of International App. No. PCT/FR2011/050369 which was filed on Feb. 22, 2011 and which claims priority to French application 1052054 filed on Mar. 22, 2010 the content of which (text, drawings and claims) is incorporated here by reference.

BACKGROUND

The invention relates to devices used to perform diagnostics in communication networks equipped with a bus comprising at least one electric wire on which a voltage can be measured in a non-intrusive manner.

The buses of certain communication networks of the aforementioned type comprise a limited number of wires (at least one) to which communication equipment can be connected in parallel in order to exchange data between them by means of multiplexed frames. This is for instance in the case of networks such as CAN LS ("Controller Area Network Low Speed"), CAN HS ("Controller Area Network High Speed"), VAN ("Vehicle Area Network"), LIN ("Local Interconnect Network"), ARINC ("Aeronautical Radio Inc.") or I2C (or IIC "Inter-Integrated Circuit") which are used in areas such as vehicles (including automotive type vehicles), industrial installations, in aeronautics, consumer electronics and in the railroad domain.

Because of the high number of connections involved in such networks, they can be the object of numerous and difficult to detect operating faults (or breakdowns). For instance, they can be the object of a short-circuit between a data transmitting electric wire and a ground, a short-circuit between a data transmitting electric wire and the voltage of a power network (for instance of a vehicle), a short-circuit between two data transmitting electric wires, or the outage of one data transmitting electric wire.

The larger a network the more difficult it becomes to diagnose the origin of an operating fault (or breakdown) occurring within the network. Certain devices (or tools) such as those described in, for instance, U.S. Pat. No. 5,491,418, U.S. Pat. No. 4,957,847, U.S. Pat. No. 4,796,206, FR 266641 8 and EP 0231 607 are available for diagnosing breakdowns. But they all have at least one disadvantage, such as for instance the need for establishing, with the network, a bidirectional communication according to a predefined, and therefore intrusive, protocol, and/or the need for using relatively powerful processors, and/or the need for complex programming, and/or large overall dimensions, and/or the need for being operated by previously trained technicians.

BRIEF SUMMARY

The goal is therefore to propose an alternative non-intrusive solution for delivering instant diagnostics, that is usable in any communication network comprising a bus with wire(s), and in addition which occupies little space and/or is particularly simple to use.

For this purpose, a device is provided that is dedicated to diagnosing operating situations in at least one communication network having a bus comprising N (electric) wire(s), wherein N a 1, and comprising:

P connection means, wherein P N, suitable to be connected in parallel respectively to at least N wires of the bus for accessing the P available voltages, conversion means arranged for converting the P voltages in P first digital signals ($S1(p,t)$), processing means arranged for forming a measurement vector ($V(t)$) associated with a voltage measurement time (t) and comprising K elements selected among the P first digital signals ($S1(p,t)$), then for comparing at least this measurement vector ($V(t)$) with at least I pairs, wherein $I \geq 1$, of first ($V_{r1}(i,t)$) and second ($V_{r2}(i,t)$) reference vectors comprising K elements and representative of K minimum and maximum values that can be assumed by the K elements of the measurement vector ($V(t)$), in order to deliver I second signals ($S2(i)$) representative each of the result of a comparison, whereby each result is representative of an operating situation on the bus, and I display means, each arranged for signaling an operating situation represented by a second delivered signal ($S2(i)$).

Here "operating situation" is understood to be any type of situation that can occur during the operation of a network. For instance, it could involve an operating fault or also the absence of an operating fault. In this way, the device can detect the absence of data on the bus or (ab)normal operation of the network or a particular type of dysfunction, or a particular configuration of the signals, which is representative of the status of a system (such as for instance high voltages but in spite of everything in accordance with the standards or specifications). Here, "absence of operating fault" is understood to be both the presence of data on the bus as the detection of normal operation of the network or the absence of a problem or of a particular type of dysfunction.

The diagnostic device according to the invention can comprise other characteristics which can be taken separately or in combination, and in particular:

its processing means can be arranged for comparing Q measurement vectors ($V(t)$), wherein $Q \geq 2$, associated respectively with Q measurement times of different voltages, with I pairs of first ($V_{r1}(i,t)$) and second ($V_{r2}(i,t)$) reference vectors, in order to deliver I second signals ($S2(i)$) each representative either of an operating situation on the bus when the number of measurement vectors ($V(t)$), having at least one element which is not included between the corresponding elements of one pair, is greater than or equal to a selected threshold, or of an opposite operating situation on the bus when the number of measurement vectors ($V(t)$), having at least one element which is not included between the corresponding elements of one pair, is smaller than this selected threshold;

in a variant, its processing means can be arranged for comparing Q measurement vectors ($V(t)$), whereby $Q \geq 2$, associated respectively with Q measurement times of different voltages, with I pairs of Q first reference vectors ($V_{r1}(i,t)$), associated respectively with Q times, and Q second reference vectors ($V_{r2}(i,t)$), associated respectively with these Q times, in order to deliver I second signals ($S2(i)$) each representative either of an operating situation on the bus when the number of measurement vectors ($V(t)$), having at least one element which is not included between the corresponding elements of Q first reference vectors ($V_{r1}(i,t)$) and Q second reference vectors ($V_{r2}(i,t)$ of the same pair, is greater than or equal to a selected threshold, or representative of an opposite operating situation on the bus when the number of measurement vectors (V(t)), having at least one element which is not included between the corresponding elements of the Q first reference vectors ($V_{r1}(i,t)$) and Q second reference vectors ($V_{r2}(i,t)$) of the same pair, is smaller than the selected threshold;

in this variant, as in the other, the selected threshold may not vary from one pair to the other, or it can vary according to the pair with which it is associated;

its conversion means can have an acquisition period which is smaller than the acquisition time of a voltage bit on the bus;

at least one of the K elements of a measurement vector (V(t)) can result from a selected mathematical combination of at least two of the P first digital signals ($S1(p,t)$);

it can comprise P conversion means arranged for converting respectively the P voltages in P first digital signals ($S1(p,t)$);

its display means can comprise at least one light indicator associated with a second signal ($S2(i)$) and arranged for being placed in an illuminated state or in an off state as a function of the value of the associated second signal ($S2(i)$);

it can further comprise amplification means, mounted upstream of the display means, and arranged to generate currents suitable to place each light indicator in an on state or an off state according to the value assumed by the second ($S2(i)$) associated signal;

it can further comprise timing means, inserted between its processing means and its display means, and arranged to maintain each second signal ($S2i$) at its initial value during a selected time delay, so that each functional situation is signaled during at least the delay time;

the timing means can comprise at least a monostable retriggering circuit, for instance with capacitor(s);

one of its P connection means can be suitable for being connected in parallel to a power supply source to supply it with a sampled voltage;

further, it can comprise regulation means suitable to be coupled to the connection means which are dedicated to the voltage supply source, in order to regulate the sampled supply voltage and to deliver a regulated voltage;

further, it can comprise filtering means, suitable to be connected downstream of the connection means which is dedicated to the voltage supply source, and arranged at least for filtering voltage variations of the voltage supply source;

further, it can comprise amplification means, mounted upstream of the conversion means, and arranged to amplify at least the voltages taken from the bus wires;

further, it can comprise blocking means, mounted upstream of its conversion means, and arranged to stabilize the voltages taken from the bus wires so that they do not change value during their conversion;

further, it can comprise protection means mounted in parallel to the connection means, which is connected in parallel to the bus wires, upstream of its amplification means, and suitable to ensure protection, in particular against electrostatic discharges occurring in the bus wires.

The device is particularly suitable, although not in a limiting manner, for communication networks installed in vehicles, including automotive type vehicles.

DESCRIPTION OF THE FIGURE

Other characteristics and advantages will become clear by examining the following detailed description, and the attached drawing, in which the unique figure illustrates schematically and functionally an example of an embodiment of the diagnostic device according to the invention, connected to a CAN HS type communication network and to an external battery. The attached drawing serves not only to complete the invention, but it also contributes to its definition, where needed.

DETAILED DESCRIPTION

The goal of the invention is to offer a diagnostic device D intended to be connected to at least one communication network RC equipped with a bus BU comprising N electric wire(s) CH, CL, wherein N≥1, to which communication equipment can be connected in parallel and on which voltages V1, V2 can be measured in a non-intrusive manner.

In the following, it is assumed, as a non-limiting example, that the communication network RC is a CAN HS type network ("Controller Area Network High Speed"—ISO standard 11898). But, the invention is not limited to this type of communication network. It relates in fact to any type of communication network equipped with a bus authorizing non-intrusive voltage measurements on its wire(s), and in particular networks of the type CAN LS ("Controller Area Network Low Speed"—ISO standard 11898), VAN ("Vehicle Area Network"), LIN ("Local Interconnect Network"), ARINC ("Aeronautical Radio Inc.") and I2C (or IIC "Inter-Integrated Circuit"). Consequently, the invention relates specifically to vehicle domains (terrestrial, maritime (or fluvial) and aerial), the domain of industrial installations, and the domain of consumer electronics.

In the following it is assumed, as a non-limiting example, that the network RC is part of a vehicle, including an automotive type vehicle (such as, for instance, a car). But, as indicated above, the invention is not limited to this application.

In addition, it is assumed in the following, as a non-limiting example, that the diagnostic device D is intended to perform diagnostics only for one type of network (here the CAN HS type). But, this is not mandatory. It can indeed be arranged in such manner as to perform diagnostics for at least two different types of networks.

As illustrated in a non-limiting manner in the unique figure, a CAN HS type network RC comprises a bus BU provided with first CL and second CH electric wires which are dedicated to the transport of data frames and are called respectively "CAN_L" and "CAN_H".

As illustrated, such a diagnostic device D comprises at least P connection means MCp (p=1 to P, wherein P≥N, N being the number of wires of the bus BU (here equal to two)), conversion means MVp, processing means MT and display means Mai (i=1 to I) which cooperate among themselves.

At least some of the P connection means MCp are arranged in a manner such that they are connected in parallel to their (diagnostic) device D of bus BU, in view of accessing (or sampling) voltages V1, V2 which are available on the wires of the bus BU. Here, the two connection means MC1 and MC2 are arranged for sampling voltages V1 and V2, respectively, from the electric wires CL and CH.

These connection means MC1 and MC2 comprise for instance two electric connection cables, each equipped with a connector at one of the two opposite extremities, for instance a "crocodile clip" or "test prod" type connector (that can be inserted in a connector socket of the bus BU).

Note that, as illustrated in a non-limiting manner, it is advantageous for device D to comprise protection means MP1 and MP2 mounted in parallel to the connection means MC1 and MC2, which are connected respectively in parallel to the wires CL and CH of bus BU, upstream of at least some of its conversion means (here MV1 and MV2). These protection means MPp are arranged in such a manner as to ensure the protection of conversion means MV1 and MV2, in particular against electrostatic discharges which can occur in the wires CL and CH of the bus BU.

It is also noted that it can be advantageous, as illustrated in a non-limiting manner, for the device D to comprise dividing points PD1 and PD2 each mounted in parallel to one of the connection means MC1, MC2 of wires CL, CH. These dividing points PDp (or any equivalent means for splitting the voltage) are intended to convert, in an analog manner, the voltages they receive to voltages adapted to the range of input voltages which can be supported by any blocking means MBp (which will be discussed later) and conversion means MVp, while having a high input impedance and avoiding a direct electric link between the electronic circuits of device D and the exterior, in order to protect them. For instance, and as illustrated in a non-limiting manner, the low voltage of these dividing points PD1 and PD2 is that of the ground.

It is also noted, as illustrated in a non-limiting manner, that the device D can also optionally comprise another connection means MC3 intended to be connected in parallel to a voltage supply source BA to supply voltage to the elements constituting the device D. In the case of a vehicle, the voltage supply source BA is, for instance, the on-board 12 Volt battery.

This other connection means MC3 comprises, for instance, two electric connection cables, each provided at one of the two opposite extremities with a connector, for instance a crocodile clip or test prod type, which is coupled to the plus (+) terminal of the battery BA or to a ground screw of the vehicle.

It is important to note that in a variant the device D can comprise an internal supply source, for instance a rechargeable battery, on the condition that it has a wire connected to a ground screw of the vehicle in order to use it as reference for the voltages V1 and V2 present on the wires CL and CH.

Note also that when the device D does not comprise an internal supply source, it is advantageous, as illustrated in a non-limiting manner, that it comprises regulating means MR coupled to the extremities of the electric connection cables (of the connection means MC3), which are opposite to those provided with connectors. These regulating means MR are arranged in such manner as to regulate the supply voltage which is drawn by the connection means MC3 from the external supply source BA, in order to supply a regulated voltage to at least some of the elements constituting the device D.

It is also noted that it is advantageous, as illustrated in a non-limiting manner, for the device D to comprise filtering means MG intended to be connected downstream of the connection means MC3 and arranged for filtering at least the voltage variations of the external supply source BA. This is particularly useful when the device D is supplied by an external supply source BA with significant voltage variations (as is the case in the power supply network of a vehicle). For instance, the filtering means MG can comprise a diode mounted in series and a capacitor mounted in parallel between the connection means MC3 and the regulating means MR. The diode is intended to ensure protection against polarity inversions of the external supply (BA). The capacitor is by preference polarized and with high capacitance in order to ensure a significant "reservoir" effect for filtering of the voltage variations. It is to be noted that such filtering means MG also ensures protection against electrostatic discharges.

It is also noted that it can be advantageous, as illustrated in a non-limiting manner, for the device D to comprise a dividing point PD3 mounted in parallel between the ground and the connection means MC3 (and more precisely here between the diode and the capacitor of the filtering means MG). This voltage divider PD3 (or any equivalent means for dividing the voltage) is intended to convert, in an analog manner, the voltage it receives in a voltage adapted to the range of input voltages that can be supported by any blocking means MBp, (to which we will return later) and the conversion means MVp, while having a high input impedance for the wires connected to the network and avoiding a direct electric link between the electronic circuits of the device D and the exterior, in order to protect them. For instance, and as illustrated in non-limiting manner, the low voltage of this voltage divider PD3 is that of the ground.

The conversion means MVp of the device D are arranged for converting the P selected voltages in P first digital signals $S1(p,t)$. The parameter p designates one of the selected voltages P (p=1 to P), and the parameter t designates a measurement (or sampling) time of one of the P voltages. It is to be noted that, in the illustrated non-limiting example, P is equal to 3, given that voltages V1 and V2, respectively, are taken from wires CL and CH and voltage V3 from the external supply source BA, here via dividing bridge PD3.

As illustrated in a non-limiting manner, the conversion means MVp can be made in the form of P discrete or integrated analog/digital converters, each converting an analog voltage Vp in a first digital signal $S1(p,t)$. But, this is not mandatory. Indeed, in a variant, the conversion means MVp can be made in the form of a unique discrete or integrated analog/digital converter, sequentially converting each analog voltage Vp (presented then in multiplexed manner) in a first digital signal $S1(p,t)$.

For instance, conversion means MVp can convert the drawn analog voltages Vp in first digital signals $S1(p,t)$ of 8 bits (or an octet).

It is noted that it is advantageous, as illustrated in a non-limiting manner, for device D to comprise discrete or integrated blocking means MBp, mounted upstream of conversion means MVp. The latter (MVp) are arranged for stabilizing the voltages (here from the wires CH and CL drawn from the bus BU and from the external supply source BA, here via dividing bridge PD3) so that they are as stable as possible to facilitate their conversion by the conversion means MVp.

It is also noted that it is advantageous, as illustrated in a non-limiting manner, for device D to comprise a first amplification means MF1p mounted upstream of its conversion means MVp (and more precisely here between dividing bridges PDp and its blocking means MBp). But in the absence of blocking means MBp they are connected directly to the conversion means MVp (upstream of the latter). These first amplification means MF1p are arranged to amplify the voltages sampled from the wires of the bus BU and here as well from the external supply source BA so that any blocking means MBp and conversion means MVp dispose of a current and voltage well adapted to their processing capacity.

The processing means MT is supplied with first digital signals $S1(p,t)$ by the conversion means MVp.

It is noted that these processing means MT can be comprised of a microprocessor MCT or, as illustrated in a non-limiting manner, can be part of a microprocessor MCT which is, for instance, as illustrated, supplied with regulated voltage by the regulating means MR. It is also noted, as illustrated in a non-limiting manner, that the blocking means MBp and/or the conversion means MVp can optionally be part of (in other words integrated in) the microprocessor MCT.

In a variant, the microprocessor MCT could be replaced by other types of programmable logic circuits, such as ASICs.

The processing means MT is first arranged to form a measurement vector V(t), associated with a voltage measurement time t, starting from at least some of the first P digital signals S1(p,t) that they receive from the conversion means MVp. More precisely, each formed measurement vector V(t) comprises K elements which are selected among at least the P first digital signals S1(p,t).

It is noted that at least one of the K elements of a measurement vector V(t) can be a "virtual" element. Here, "virtual element" is understood to be an element of a measurement vector V(t) which results from a mathematical combination selected among at least two of the first P digital signals S1(p,t). For instance, a virtual element can be the result of the difference between the voltages V1 and V2 taken respectively from wires CL and CH. This difference constitutes a differential voltage which can be useful to discriminate the so-called "recessive" and "dominant" states. It is reminded that, in case of a CAN HS network, a dominant state corresponds with a voltage V2 of approximately 3.5 V on the wire CH (CAN_H), a voltage V1 of approximately 1.5 V on the wire LH (CAN_LH), and a differential voltage V2-V1 of approximately 2V. Any type of combination carried out with any type of mathematical operator can be envisaged. It is noted that for types of networks other than CAN HS, a mathematical operation can, for instance, comprise a multiplication, for instance to validate a signal only when another signal is not null.

The processing means MT is also arranged, once it has constituted a measurement vector V(t), for comparing at least the latter (V(t)) with at least I pairs of first $V_{r1}(i,t)$ and second $V_{r2}(i,t)$ reference vectors. The number I is greater than or equal to one (1).

Here, "first reference vector $V_{r1}(i,t)$" is understood to be a vector which is constituted in advance of K elements representative respectively of K minimum values which can be assumed in normal operation by the corresponding K elements of a corresponding measurement vector V(t). Here, "second reference vector $V_{r2}(i,t)$" is understood to be a vector which is constituted in advance of K elements representative respectively of K maximum values which can be assumed in normal operation by the corresponding K elements of a corresponding measurement vector V(t). It is important to note that a first $V_{r1}(i,t)$ or second $V_{r2}(i,t)$ reference vector may, or may not, be a function of measurement time t relative to the current measurement time.

For instance, the comparison of one element of a measurement vector V(t) is intended to determine whether its value is between the corresponding elements of a pair ($V_{r1}(i,t)$, $V_{r2}(i,t)$), in other words between a minimum value (optionally included) and a maximum value (optionally included). It is indeed evident that if the value of at least one element of a measurement vector V(t) is not between the corresponding elements of a pair ($V_{r1}(i,t)$, $V_{r2}(i,t)$), then a particular operating condition exists on the bus BU (possibly an operating fault). Consequently, the result of a comparison is representative of an operating situation on the bus BU (possibly a fault or absence of an operating fault).

Here "operating situation" refers to any type of situation that could occur during operation of a network RC. It could for instance involve an operating fault, or the absence of an operating fault. In this way, device D detects the absence of data on the bus BU, or an abnormal operation of the network RC, or a particular type of problem or dysfunction, or a particular configuration of the signals representative of the status of a system (such as for instance high voltages but nevertheless in compliance with standards or specifications). Here, "absence of operating fault" is understood to be the presence of data on the bus as the detection of normal operation of network RC, or the absence of a problem or dysfunction of a particular type.

It is noted that the processing means MT can be arranged in such manner so as to perform filtering of the measurement vectors in order to ignore some among them that might be erroneous. Two types of filtering can be envisaged, one with respect to the status of the sampled voltages Vp, the other with respect to the transitions of the sampled voltages Vp.

The first type of filtering is particularly suitable in case the device D is the object of electromagnetic interference, in case the operation of the communication network RC is affected by unwanted voltages, or in case the analog/digital conversion is performed when converted voltages vary rapidly (for instance in the case of a transition). This first type of filtering comprises for instance in comparing Q measurement vectors V(t), associated respectively with Q measurement times of the different (by preference successive) voltages, to I pairs of first $V_{r1}(i,t)$ and second $V_{r2}(i,t)$ reference vectors (here independent of parameter t). Here, the number Q is greater than or equal to 2.

This type of filtering requires the processing means MT to store the Q last measurement vectors that they it constituted, namely V(t), V(t−1), V(t−2), . . . , V(t−Q+1).

Each of the Q measurement vectors considered is then compared (element by element) with I first reference vectors $V_{r1}$ (i,t) which are different but correspond with it, and with I second reference vectors $V_{r2}(i,t)$ which are different but correspond with it, according to the previously described method for a unique measurement vector. Then, the processing means MT determines for each comparison of Q measurement vectors V(t) with one of the I pairs of first $V_{r1}(i,t)$ and second $V_{r2}(i,t)$ reference vectors, whether the number of measurement vectors V(t), which have at least one element which is not included between the corresponding elements of a pair, is greater than or equal to a selected threshold. Then, the processing means MT delivers I second signals S2(i) which are each representative either of an operating situation on the bus BU (for instance a fault) when the number of measurement vectors V(t) determined is greater than or equal to the selected threshold, or of an opposite operating situation on the bus BU (for instance the absence of fault) when the number of measurement vectors V(t) determined is smaller than the selected threshold.

Note that in a first embodiment, the selected threshold may not vary from one pair to another, while in a second embodiment the selected threshold can vary according to the pair with which it is associated.

It is also noted that to simplify the comparisons, the elements of Q measurement vectors V(t) and the elements of the first $V_{r1}(i,t)$ and second $V_{r2}(i,t)$ reference vectors can be coded in the same number of bits (for instance 8). But, this is not mandatory.

Note also that the Q measurement vectors V(t) can be optionally regrouped in a measurement matrix of which each column (or line) is a measurement vector V(t). With this arrangement, a more compact comparison algorithm is obtained and is therefore less costly to implement. Indeed, it is possible, for instance, to arrange in a memory, in ascending order from the oldest to newest, the columns (or lines) of the current measurement matrix, in other words the matrix formed by the Q last measurement vectors V(t), then a comparison loop can be created with the number of the measurement vector V(t), and incrementing by Q the placement in memory of the data of the measurement matrix. It is then preferable to use a circular type memory (more precisely with circular addressing).

Note that the device can function with an acquisition time of the conversion means MVp which is smaller than the duration of a voltage bit on a wire CH, CL of bus BU, in particular with the goal of avoiding that certain phenomena of short duration peculiar for network RC are not analyzed. Note that in case the conversion means MVp comprises only one converter combined with a multiplexer of voltages Vp which presents the analog signals to be converted successively one by one at its input, the comparison algorithm must go through as many conversion steps as there are voltages Vp to be analyzed. In this case, a period, which is smaller than the duration of a voltage bit on the bus BU, can be used to perform one time the conversion of all voltages Vp to be analyzed, for the same reasons as above.

The second type of filtering comprises, for instance, in comparing Q measurement vectors V(t), associated respectively with Q different (and by preference successive) voltage measurement times (t), with I pairs of Q first reference vectors $V_{r1}(i,t)$, associated respectively with Q times, and Q second reference vectors $V_{r2}(i,t)$, associated respectively with the same Q times. Therefore, the first $V_{r1}(i,t)$, and second $V_{r2}(i,t)$ reference vectors here are dependent on parameter t, given that a pair of vectors is associated with each time element between t-Q-1 and t. Here the number Q is also greater than or equal to 2.

It is to be noted that the Q measurement vectors V(t) can be placed in a measurement matrix, which is then compared to I first matrices of minimum reference (each comprising Q first reference vectors $V_{r1}(i,t)$) and I second matrices of maximum reference (each comprising Q second reference vectors $V_{r2}(i,t)$).

This second type of filtering requires the processing means MT to store the Q last measurement vectors that they have made, namely V(t), V(t−1), V(t−2) . . . , V(t−Q−1), and the first and second reference matrices.

Each element of the measurement matrix is then compared with the corresponding element of each of the I first reference matrices and the corresponding element of each of the I second reference matrices, according to the previously described method for a unique measurement vector. Then, the processing means MT determines for each comparison of the measurement matrix with one of the I pairs of first and second reference matrices, the number of measurement vectors V(t), which have at least one element which is not included between the corresponding elements of a pair, is greater than or equal to the selected threshold. Then, the processing means MT delivers I second signals S2(i) which are each representative either of an operating situation on the bus BU when the number of measurement vectors V(t) determined is greater than or equal to the selected threshold, or an opposite operating situation on the bus BU when the number of measurement vectors V(t) determined is smaller than the selected threshold.

It is understood that voltage transitions Vp can be detected with this second type of filtering. But, it should be noted that it requires the implementation of a time display (described below), because the result of the comparison is only true during few successive conversions by the conversion means MVp when the selected threshold is high. Note also that the device allows for the detection of both synchronous and asynchronous voltage transitions on the bus BU.

Note that in a first embodiment the selected threshold may not vary from one pair to another, while in a second embodiment the selected threshold can vary according to the pair it is associated with.

In the case of CAN HS type network, the device D can, for instance, diagnose at least some of the operating situations among those listed below:

normal operation of the network RC,
the absence of data frames on the bus BU,
a short-circuit between the electric wire CL and the ground,
a short-circuit between the electric wire CH and the ground,
a short-circuit between the electric wire CL and a voltage of the power network of the vehicle,
a short-circuit between the electric wire CH and a voltage of the power network of the vehicle,
a short-circuit between the two electric wires CL and CH,
an outage of the electric wire CL, and/or
an outage of the electric wire CH.

Once the processing means MT disposes of the result of each of the I comparisons, it delivers I second signals S2(i) representative respectively of the results of these I comparisons.

The I display means MAi (i=1 to i) of device D are each arranged to signal to a user an operating situation represented by a second signal S2(i) delivered by the processing means MT.

These display means MAi can be installed, for instance, in the front face of a housing BO of device D, in which are housed the conversion means MVp and the processing means MT, and any regulating means MR, first amplification means MF1p, filtering means MG, dividing bridges PDp, protection means MPp, blocking means MBp, and other timing means MTPi and second amplification means MF2i which will be discussed below.

For instance, the display means MAi can comprise I light indicators associated respectively with the I second signals S2(i), and therefore with I operating situations (as well as their complementary situations (the opposite operating situations)). Each light indicator MAi can be arranged, for instance, in the form of a light emitting diode (or LED) that can be placed in a switched on state or in switched off state as a function of the value of the associated second signal S2(i).

Each light indicator MAi can protrude from the side of an outer face (visible) of the front face of housing BO in order to be observed easily by the user.

As indicated previously, the number of light indicators MAi depends on the number of second signals S2(i) which are delivered by the processing means MT.

For instance, the housing BO can comprise six light indicators MAi (i=1 to 6):

a first light indicator MA1 can signal the normal operation of network RC when it is lit and abnormal functioning of the network RC when it is switched off,
a second light indicator MA2 can signal the presence of data frames on the bus BU when it is lit and the absence of data frames on the bus when it is switched off,
a third light indicator MA3 can signal a short-circuit between the electric wire CL and a voltage of the power supply network of the vehicle when it is lit and absence of short-circuit between electric wire CL and a voltage of the power supply network of the vehicle when it is switched off,
a fourth light indicator MA4 can signal a short-circuit between the electric wire CH and a voltage of the power supply network of the vehicle when it is lit and the absence of a short-circuit between the electric wire CH and a voltage of the power supply network of the vehicle when it is switched off.

- a fifth light indicator MA5 can signal a short-circuit between the electric wire CL and a ground when it is lit and the absence of short-circuit between the wire CL and a ground when it is switched off, and
- a sixth light indicator MA6 can signal a short-circuit between the electric wire CH and a ground when it is lit and the absence of short-circuit between the electric wire CH and a round when it is switched off.

Device D can also comprise at least one additional light indicator, to signal at least one additional function, such as for instance the fact that it is connected (or functioning, and therefore usable) or disconnected (or not functioning, and therefore unusable).

It is important to note that the display means MAi can have forms other than those presented above (light indicators). Indeed, they can include, for instance, a display screen (for instance a liquid crystal screen (or LCD)) on which messages intended to signal each operating situation associated with a second signal $S2(i)$ can be displayed. In this case, the display means MAi also must comprise conversion means for converting each value of second signal $S2(i)$ in a displayed message. Note that a displayed message can be accompanied eventually by a sound signal of equivalent or identical synthesis.

Note also that the device D optionally can comprise timing means MTPi inserted between the processing means MT and the display means MAi and arranged in such manner as to maintain each second signal $S2(i)$ at its initial value during a selected time delay. More precisely, these timing means MTPi, which can be discrete or integrated (and therefore integrated in microprocessor MCT (or equivalent), as illustrated in non-limiting manner), are tasked, when they receive a second signal $S2(i)$ with a given value, with delivering to their outputs this same given value during the selected delay. In this way, each operating situation can be signaled during at least the duration of the delay.

This delay time can be selected to be greater than the average retinal persistence of the human eye. This option is intended to let a user visualize the switching on or off of the light indicator MAi, including when the processing means MT generate the associated second signal $S2(i)$ during a very short time because of an intermittent operating situation (for instance linked to a loose contact and a transient vibration). If necessary, this time delay can concern only the displaying of the presence of a particular situation.

For instance, a timing delay can be selected to be at least about 40 ms.

These timing means MTPi can comprise, for instance, at least a monostable retriggering circuit, for instance with capacitor(s), associated with at least a second signal $S2(i)$. This type of circuit quickly charges a capacitor at the beginning of the delay and then slowly discharges this capacitor, whereby the speed gap between the charge and the discharge can be obtained by means of a diode which is conducting during charging.

It is to be noted that the device D can also comprise second amplification means MF2i mounted upstream of the display means MAi, and by preference between the timing means MTPi and the display means MAi. These second amplification means MF2i are arranged in such manner as to generate currents which are suitable (or capable of) placing each light indicator MAi in illuminated or switched off state according to the value assumed by the associated second signal $S2(i)$.

These second amplification means MF2i can comprise for instance at least one amplifier with a transistor comprising an input suitable for receiving a second signal $S2(i)$ via the eventual timing means MTPi and an output connected to a light indicator MAi for supplying it with current (and therefore controlling its operation).

The utilization of device D is particularly simple. Once the user has connected it in parallel to the network RC (and more precisely to bus BU), and if necessary with the external battery BA, via its connection means MCp, it immediately delivers results via its display means MAi.

If an operating situation is signaled by the display means MAi, then the user can disconnect a control element from the network RC in order to determine if it is at the origin of this operating situation. Each operating situation can also correspond in a predetermined manner (for instance in a relational table) to at least one (possibly suspect) control element. Note that the treatment of predetermined fault types can be comprised of a type of corrective action available with the device D according to the invention.

If this is the case, and the device D is no longer signaling another operating situation, but is now signaling normal operation, the diagnostic is ended and the suspect control element must be examined.

If the disconnected control element is not at the origin of an operating situation, the user reconnects it to the network RC and disconnects another control element from the network (RC), until he determines the one (or the ones) that is (are) at the origin of the reported operating situation(s).

Note that if one of the situations is located at the level of the wires of the network RC (pinched or cut wires), the same method can be applied (specifically in the case of a corrective maintenance method called "load shedding"). These connection/disconnection operations are in general called corrective maintenance method by load shedding.

In the presence of multiple operating situations, the device D signals a normal operation once all control elements at the origin of an operating situation have been disconnected. As long as one control element at the origin of one of the operating situations remains connected, the device D can continue signaling an operating situation.

The device D, according to the invention, is particularly advantageous, because it is not only non-intrusive, but also a passive type device to the extent that it does not emit data to the network RC and only monitors the voltages Vp which are present on its bus BU and eventually on its external supply source BA.

The invention is not limited to the above described embodiments, which are only examples, of the diagnostic device, but encompasses all variants that a person skilled in the art can envisage in the framework of the following claims.

The invention claimed is:

1. A diagnostic device for operating situations in at least one communication network having of a bus with N wires, wherein N≥1, characterized in that the diagnostic device comprises:
   i) P connection means, wherein P≥N, suitable to be connected in parallel respectively at least to said N wires of the bus to access P available voltages,
   ii) conversion means arranged for converting said P voltages in P first digital signals ($S1(p,t)$),
   iii) processing means arranged for forming a measurement vector ($V(t)$) associated with a measurement time (t) of the voltages and comprising K elements selected among at least said P first digital signals ($S1(p,t)$), then for comparing at least said measurement vector ($V(t)$) with at least I pairs, wherein I≥1, of the first ($V_{r1}(i,t)$) and second ($V_{r2}(i,t)$) reference vectors comprising K elements and representative of K minimum and maximum values that can be assumed by the K elements of said measurement vector (V(t)), in order to deliver I second signals (S2(*i*)) each representative of the result of the comparison, whereby each result is representative of an operating situation on said bus, and iv) I display means each arranged for signaling an operating situation represented by a second delivered signal (S2(*i*)).

2. The device according to claim 1, wherein said processing means is arranged for comparing Q measurement vectors (V(t)), whereby Q≥2, associated respectively with Q measurement times of the different voltages, with I pairs of first ($V_{r1}(i,t)$) and second ($V_{r2}(i,t)$) reference vectors, in order to deliver I second signals (S2(*i*)) each representative either of a functional situation on said bus when the number of measurement vectors (V(t)), having at least one element that is not included between the corresponding elements of a pair, is greater than or equal to a selected threshold, or of an opposite operating situation on said bus when the number of measurement vectors (V(t)), having at least one element that is not between the corresponding elements of a pair, is smaller than said threshold.

3. The device according to claim 1, wherein said processing means is arranged for comparing Q measurement vectors (V(t)), wherein Q≥2, associated respectively with Q measurement times of the different voltages, with I pairs of the Q first reference vectors ($V_{r1}(i,t)$), associated respectively with Q times, and Q second reference vectors ($V_{r2}(i,t)$), associated respectively with said Q times, in order to deliver I second signals (S2(*i*)) each representative either of an operating situation on said bus when the number of measurement vectors (V(t)), having at least one element that is not included between the corresponding elements of the Q first reference vectors ($V_{r1}(i,t)$) and Q second reference vectors ($V_{r2}(i,t)$) of the same pair, is greater than or equal to a selected threshold, or an opposite operating situation on said bus when the number of measurement vectors (V(t)), having at least one element which is not included between the corresponding elements of the Q first reference vectors ($V_{r1}(i,t)$) and Q second reference vectors ($V_{r2}(i,t)$) of the same pair, is smaller than said selected threshold.

4. The device according to claim 2, wherein said selected threshold does not vary from one pair to another.

5. The device according to claim 2, wherein said selected threshold varies according to the pair with which it is associated.

6. The device according to claim 1, wherein said conversion means has an acquisition period which is smaller than the duration of acquisition of a voltage bit on said bus.

7. The device according to claim 1, wherein at least one of the K elements of a measurement vector (V(t)) results from a selected mathematical combination of at least two of said P first digital signals (S1(*p,t*)).

8. The device according to claim 1, wherein the device comprises P conversion means arranged respectively for converting said P voltages in P first digital signals (S1(*p,t*)).

9. The device according to claim 1, wherein said display means comprises at least one light indicator associated with a second signal (S2(*i*)) and arranged for being placed in an illuminated state or in switched off state as a function of the value of said associated second signal (S2(*i*)).

10. The device according to claim 9, wherein the device further comprises amplification means mounted upstream of said display means and arranged to generate currents suitable for placing each light indicator in its illuminated or switched off state according to the value assumed by the associated second signal (S2(*i*)).

11. The device according to claim 1, wherein the device further comprises timing means inserted between said processing means and said display means and arranged to maintain each second signal (S2*i*) at its initial value during a selected time delay, so that each operating situation is signaled during at least said time delay.

12. The device according to claim 1, wherein one of said P connection means is suitable for being connected in parallel to a voltage supply source for supplying said device with a drawn voltage.

13. The device according to claim 12, wherein the device further comprises regulating means suitable to be coupled to said connection means dedicated to said voltage supply source, in such a manner as to regulate the sampled supply voltage and to deliver a regulated voltage.

14. The device according to claim 12, wherein the device further comprises filtering means suitable to be connected downstream of said connection means dedicated to said voltage supply source and arranged for filtering at least voltage variations of the voltage supply source.

15. The device according to claim 1, wherein the device further comprises amplification means mounted upstream of said conversion means and arranged for amplifying at least said voltages taken from said wires of the bus.

16. The device according to claim 15, wherein the device further comprises protection means mounted in parallel to the connection means, which are connected in parallel to the bus wires, upstream of said amplification means, and suitable for ensuring protection, specifically against electrostatic discharges occurring in said wires of the bus.

17. The device according to claim 1, wherein the device further comprises blocking means mounted upstream of said conversion means and arranged for stabilizing said voltages drawn from said wires of the bus so that they do not change value during their conversion.

18. Use of the diagnostic device according to claim 1 for a vehicle communication network.

* * * * *